United States Patent [19]

Crawford et al.

[11] Patent Number: 4,821,860
[45] Date of Patent: Apr. 18, 1989

[54] FRICTION FACING MATERIAL AND CARRIER ASSEMBLY

[75] Inventors: Peter F. Crawford, Bubbenhall; Ian C. Maycock, Leamington Spa; Graham R. Bicknell, Harbury, all of England

[73] Assignee: Automotive Products plc, Leamington Spa, England

[21] Appl. No.: 64,078

[22] Filed: Jun. 19, 1987

[30] Foreign Application Priority Data

Jun. 28, 1986 [GB] United Kingdom ............... 8615874

[51] Int. Cl.⁴ ..................... F16D 11/00; F16D 13/60
[52] U.S. Cl. ....................... 192/107 C; 188/218 XL; 192/107 R
[58] Field of Search ........... 192/107 C, 107 R, 113 A, 192/70.12, 70.14; 188/218 XL, 250 B

[56] References Cited

U.S. PATENT DOCUMENTS

| | | | |
|---|---|---|---|
| 1,744,888 | 1/1930 | Haigh | 192/107 R |
| 1,862,991 | 6/1932 | Vargha | 192/107 C X |
| 2,253,316 | 8/1941 | Armitage | 192/107 R |
| 3,231,058 | 1/1966 | Batchelor et al. | 192/107 R |
| 3,398,822 | 8/1968 | Eakin | 192/107 R |
| 4,345,676 | 8/1982 | Jarvis | 192/107 C |
| 4,529,079 | 7/1985 | Albertson | 192/107 R X |
| 4,646,900 | 3/1987 | Crawford et al. | 192/107 R |
| 4,697,683 | 10/1987 | Graton et al. | 192/107 C |

FOREIGN PATENT DOCUMENTS

| | | |
|---|---|---|
| 2361127 | 6/1974 | Fed. Rep. of Germany . |
| 2363692 | 7/1975 | Fed. Rep. of Germany ... 192/107 C |
| 2619536 | 11/1977 | Fed. Rep. of Germany . |
| 2565306 | 5/1984 | France . |
| 656167 | 8/1951 | United Kingdom . |
| 941279 | 11/1963 | United Kingdom . |
| 2039637 | 1/1979 | United Kingdom . |
| 2044864 | 10/1980 | United Kingdom . |
| 1580510 | 12/1980 | United Kingdom . |
| 2170871 | 8/1986 | United Kingdom . |
| 2191830 | 12/1987 | United Kingdom . |

Primary Examiner—Dirk Wright
Attorney, Agent, or Firm—Solon B. Kemon

[57] ABSTRACT

A friction material and carrier assembly (which is to be used in the construction of a driven plate of a dry friction clutch) comprises a circular carrier plate having at its periphery radially extending spokes or paddles which are elastically pliable axially of the carrier plate. Two annular friction facings which are resilient and capable of flexing are bonded by respective layers of silicone rubber to opposite sides of the paddles. Each rubber layer can be formed by a plurality of strips or beads of rubber. The paddles arrangement is capable of sinuous flexing circumferentially of the assembly, and when the assembly is in a driven plate in a clutch applying the clamp load specified for the clutch, the overall axial thickness of the combination formed by the paddles and rubber layers and the friction facings is reduced by between 0.05 mm and 2.00 mm.

14 Claims, 7 Drawing Sheets

| CLUTCH DRIVEN PLATE SIZE IN mm. | CLAMP LOAD IN daN | | | PRESSURE ON FACING MATERIAL IN N/mm² | |
|---|---|---|---|---|---|
| | MAX | AVERAGE (most common) | MIN | MAX | MIN |
| 165 | 350 | 315 | 260 | 0·1730 | 0·1285 |
| 170 | — | 275 | — | 0·1365 (Average) | |
| 180 | 400 | 330 | 275 | 0·1702 | 0·1170 |
| 190 | 440 | 375 | 200 | 0·1995 | 0·0682 |
| 215 | 680 | 441 | 350 | 0·2142 | 0·0924 |
| 240 | 825 | 495 | 400 | 0·2055 | 0·0821 |
| 280 | 995 | 880 | 420 | 0·2486 | 0·0582 |
| 330 | 1700 | 1020 | 518 | 0·2500 | 0·0528 |
| 380 | 2100 | 1150 | 963 | 0·1552 | 0·0635 |
| 430 | 3580 | 1520 | 1220 | 0·1936 | 0·0433 |

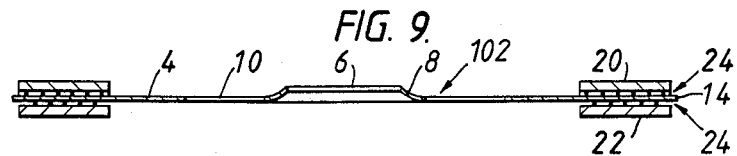
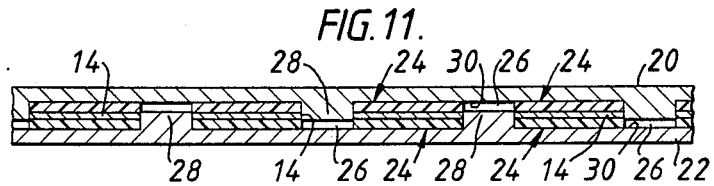
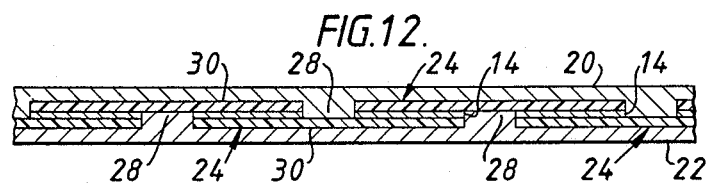
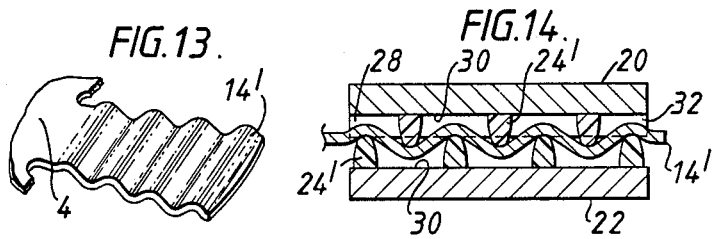
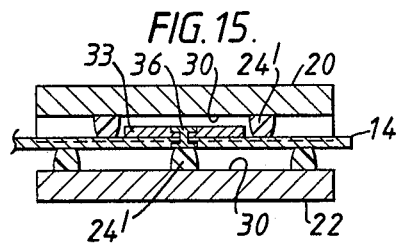

FRICTION FACING MATERIAL AND CARRIER ASSEMBLY

BACKGROUND OF THE INVENTION

This invention relates to friction clutches, particularly for motor vehicles, and provides improved friction material and carrier assemblies for the driven plates of dry plate clutches.

Such clutches present an extremely complex design and production problem because they have to be produced in very large numbers to consistent standards and suit a wide variety of drivers, ranging from strong, experienced and skillful drivers to learners taking their first driving lesson. Every driver will remember the first attempt to achieve clutch control.

In spite of intensive development throughout the history of motor vehicles, with very substantial improvement, there remain problems at the critical point of engagement between the driving member (flywheel) and driven plate. There are three major symptoms of these problems which may occur individually or in various combinations i.e. uneven take-up of the drive, producing vibration known as "judder", local heating of the driven plate friction material producing the phenomenon known as fade and intense local overheating of the driven plate clamping surfaces, on the flywheel and pressure plate respectively, resulting in "heat spots" which spoil the surfaces and cause rapid wear of the friction material and in extreme cases thermal cracking and failure of the pressure plate.

Although the clamping surfaces are produced to very high standards of surface finish and plane configuration and are carefully axially aligned, they are rotatable and essentially relatively axially displaced members so that they cannot in practice have an absolutely constantly parallel, axially spaced relationship in clamping the driven plate.

This means that the driven plate must be made with a capability of conforming to the configuration and attitude of the clamping surfaces and there is a wide variety of driven plate construction intended to achieve this.

There remains however scope for improvement in drive take-up, without judder, and avoidance of heat-spotting to save wear and fade.

The factors involved in clutch construction, operation and control are so complex that systematic study can only be conducted in particular aspects of design, materials and operation and compromises are necessary. To take one example, the values required for optimum take-up and drive transmission between the clamping surfaces and the driven plate are subject to the requirement for practicable clutch pedal movement and operation by a wide variety of drivers, from strong to weak.

Consequently progress depends upon empirical development to establish factors in terms of clutch operation experience rather than absolute values.

The present invention is the result of investigation to find those characteristics of a driven plate which give good results in operation and this has focussed attention on the friction facing material and carrier assembly in its conformation to the clamping surfaces and response to change in axial load in take-up of the drive.

SUMMARY OF THE INVENTION

According to the invention, in a friction facing material and carrier assembly, for a dry clutch driven plate, wherein said carrier is sinuously flexible circumferentially, under the specified axial clamp load of the clutch for which it is intended, said friction facing material being disposed in annular array around and bonded to and flexible with said carrier, and said friction facing material and/or said bonding material, and/or said carrier are/is so resiliently deformable that, under the specified axial clamp load, the overall thickness of the carrier and friction facing material between the clamping surfaces is reduced by between 0.05 mm and 2.0 mm inclusive.

The smaller the thickness reduction in compression of the facing material and carrier assembly, the smaller the required pressure plate movement and the simpler the design and operation of the clutch control. For the avoidance of heat spotting we believe that a minimum compression of at least 0.15 mm is to be preferred. We also believe that for avoiding heat spotting and reducing the chance of judder, it is preferred that the compression be at least 0.4 mm, whereas to avoid heat spotting and judder it is preferred that the compression be at least 1.0 mm. Therefore a preferred minimum axial compression is between 0.15 mm and 1.0 mm inclusive and a more preferred minimum axial compression is between 0.4 mm and 1.0 mm inclusive.

The compression of 0.15 to 1.00 mm inclusive may be attained by application to the friction material of an operating pressure (in a clutch) in the range of 0.04 to 0.30N/mm$^2$ inclusive.

The sinuous flexibility of the carrier may be achieved by making it as a thin disc of resiliently flexible material, such as thin steel, but preferably the carrier is a disc having its outer peripheral margin formed by radial spokes or paddles which can flex axially, or both axially and circumferentially, and are spanned circumferentially by the friction facing material annulus or segments.

The friction material is bonded to the carrier and preferably the bond comprises a heat-resistant elastomer layer of a given thickness to provide the required compression under axial clamp load. The bond also allows the aforesaid sinuous flexibility.

It is important to distinguish between the provision of an elastomer bonding layer of a given thickness and the mere use of an elastomer as a bonding material acting like an adhesive without any specified compressibility.

A suitable elastomer is a silicone rubber which vulcanises at room temperature, so that distortion by vulcanisation heating is avoided, and which has the following physical specification:

Durometer Shore A Hardness 45
Tensile Strength 28.12 Kg/cm$^2$(400psi)
Elongation 300%

Although a porous, or micro-porous, elastomer might be used, preferably the elastomer is a homogeneous solid, so that its performance is more consistent. A solid elastomer is not truly compressible and therefore the elastomer bonding layer must have scope for lateral spread.

In order to distribute lateral spread uniformly, the elastomer layer is preferably not continuous across the friction facing material but is composed of spaced beads which are spaced close enough to support the friction facing material uniformly but can individually spread laterally under clamp load.

Being a discrete layer capable of lateral spread, the bonding elastomer also can deform in shear and this permits relative angular displacement of the friction facing material under the torque of clutch rotation.

Some such angular torque displacement may be advantageous, in cushioning take-up of the drive, but must not be excessive.

According to a further feature of the invention therefore, the carrier and friction facing material have axially overlapping surfaces to abut and provide a positive limit to relative angular displacement of the friction facing material and carrier.

Preferably, the friction facing material and carrier are formed to interengage axially by complementary radially castellated or corrugated ridges providing edge abutments to limit relative displacement. This provides in effect a limiting dog-clutch construction.

Instead of providing for the axial compression of the friction facing material and carrier assembly by a bonding layer of elastomer, the friction material may itself be resilient to the required degree.

An alternative construction is possible which also has the ability to provide a driven plate with a greater capacity for axial yield, to cushion drive take-up than that afforded by compression of the aforesaid carrier and friction facing material assembly.

According to a further feature of the invention, such additional cushioning is provided by the carrier having a central web and axially radial spokes in at least two sets, at least one set of spokes being axially offset from the web towards one side of the carrier, friction material at each side of the carrier being bonded to a respective set of spokes as a resiliently deformable assembly to give the compression in thickness under clamp load as set out above.

One set of spokes may lie in the plane of the web but alternatively two sets of spokes can be respectively offset in planes on opposite sides of the carrier.

BRIEF DESCRIPTION OF THE DRAWINGS

The invention will now be further described by way of example, with reference to the accompanying drawings in which:

FIG. 9 is a section on line IX—IX in FIG. 8;

FIG. 11 is a developed section, on an enlarged scale, on line XI—XI in FIG. 8;

FIG. 12 is a section similar to FIG. 11 but illustrating a preferred mode of construction of the embodiment;

FIG. 13 is a perspective view of a fragment of a carrier plate showing a spoke constituted by a paddle of advantageous form;

FIG. 14 is a section, of a carrier and friction material assembly in a modification of the embodiment in FIG. 8 showing the spoke of FIG. 13 with friction material attached thereto;

FIG. 15 is a section, comparable to FIG. 14, in which the spoke is constituted by another modified form of paddle;

DETAILED DESCRIPTION OF EMBODIMENTS

Figure 1:
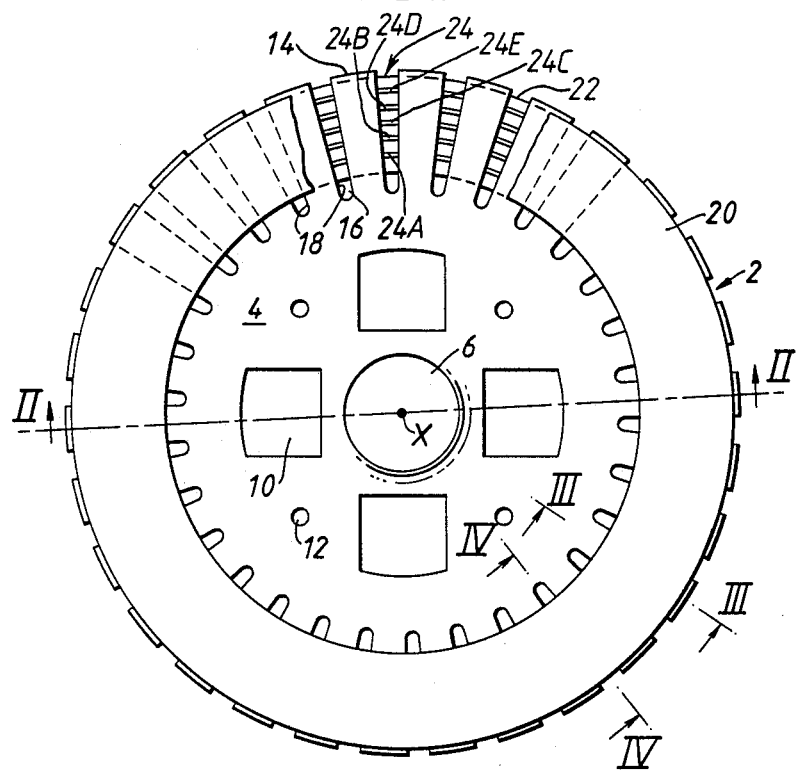
FIG. 1 is a plan view of a fragment of a friction material and carrier assembly formed according to the invention and intended to form part of a dry friction clutch driven plate.
Figure 2:
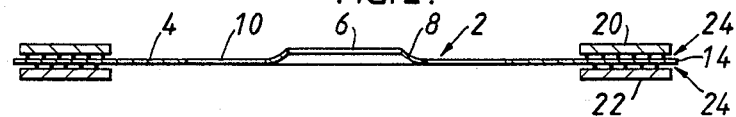
FIG. 2 is a section on line II—II in FIG. 1.

In the drawings like references identify like or comparable parts. With reference to FIGS. 1 to 6 of the drawings a friction material and carrier plate assembly is shown at 2 intended to form part of a friction clutch driven plate which can be used in a clutch, for example, a diaphragm spring clutch which may be used, for example in a motor vehicle.

The assembly comprises a mainly flat steel carrier plate 4 of disc form centrally apertured at 6 to fit, for example, on an internally splined hub (not shown) known per se when the assembly is incorporated in a said driven plate. Aperture 6 is surrounded by a flared or Belleville marginal portion 8. Also the carrier plate is formed with windows 10 for torsional vibration damping springs (not shown) known per se and holes 12 for stop rivets (not shown) known per se.

At its periphery the carrier plate 4 has a plurality of outwardly projecting paddles or spokes 14 integral with the main body of the carrier plate. The spokes are flat being substantially co-planar with the main body of the carrier plate and are substantially equi-angularly spaced about a central axis X about which the assembly 2 is intended to rotate in use. Slots 16 space the spokes which have substantially radial opposite edges 18.

In the example shown there are thirty spokes 14 and thirty slots 16. Circumferentially each spoke 14 extends over about 7° of arc and each slot 16 over about 5°. If desired the number, size, shape and spacing of the spokes can be varied.

The spokes 14 are axially pliable in the sense of being leaf springs capable of flexing resiliently along directions substantially paralled to the axis X. This enables, as intimated by the broken lines in FIG. 6, the carrier plate 4 at the spokes 14 to be sinuously flexible circumferentially.

Two substantially coincident and co-axial annular friction facings 20 and 22 are respectively bonded by an elastomeric material 24 to the opposite faces of each spoke 14. The elastomeric material 24 is adhered directly to faces of the friction facings 20, 22 and of the spokes 14.

The elastomeric material is preferably a heat resistant synthetic rubber for example a silicone rubber. The rubber can be a room temperature vulcanising (called RTV) rubber. An example of such a silicone rubber is RTV 7057 produced and sold by Dow Corning. Another example is ELASTOSIL (Trade Mark) E14 produced by Waker-Chemie G.m.b.H, and a further example is RTV 159 produced by General Electric Company of the U.S.A. However a silicone rubber of the fluorosilicone rubber kind may also be used.

Desirably the rubber is of a kind which can withstand temperatures experienced by friction facings in use without the rubber degrading to loose its necessary bond strength or resilience. It is believed that the rubber should be able to withstand temperature up to about 250° C., but an ability to withstand higher temperatures is thought desireable, for example up to about 300° C. or higher.

In the example the elastomeric material is applied in discrete, separate, spaced amounts for example as spaced, concentric annular stripes or beads, so forming interupted layers of the elastomeric material. As can be seen more clearly in FIGS. 3 and 4 the stripes or beads 24A, 24B, 24C, 24D, 24E bonding the friction facing 22 to the paddles are opposite the spaces between the stripes or beads 24F, 24G, 24H, 24J, 24K, 24L, of the elastomeric material bonding the friction facings 20 to the paddles. In this mode, the friction facings 20 and 22 are evenly supported, whilst space is left into which the beads can resiliently deform.

Each friction facing 20, 22 can be formed of any suitable friction material and may be of a non-asbestos type, but the facings are somewhat resilient such that each facing can flex or deform at least circumferentially and axially and preferably also radially.

The facings 20 and 22 may each be thin, for example 2.00 mm or less in axial thickness. However the friction facings may be thicker than 2.00 mm.

Figures 6, 7:
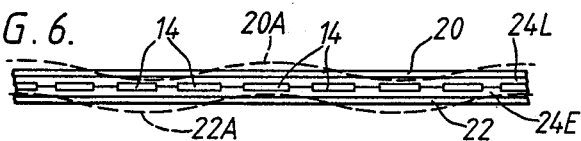
FIG. 6 is a fragmentary edge view of the assembly in FIG. 1.
FIG. 7 is by way of example, a table correlating examples of various sizes (outside diameter of clutch friction facing material) of dry clutch driven plates (having a friction material and carrier assembly according to the invention) to examples of typical axial clamp loads which may be specified for application to the friction material between a clutch pressure plate and a driven counter-pressure plate, for example a fly-wheel of an internal combustion engine, in a fully engaged clutch, and also correlating examples of clutch driven plate sizes to examples of pressures applied axially to said facing material under such clamp loads.

Due to the sinuous flexibility of the carrier plate 4 and the resilient and flexible nature of the friction facings 20 and 22, the whole of the friction facings and carrier plate assembly 2 is sinuously flexible circumferentially at the spokes 14, as indicated by broken lines 0A and 22A in FIG. 6. These broken lines 20A and 22A represent possible positions taken up by the outer faces of the friction facings during sinuous circumferential flexing.

The layers of elastomer 24 provide resilient cushioning between the friction facings and the paddles 14 and an overall axial cushioning between the friction facings. The layers 24 can each be of an appreciable thickness so that coupled with adequate flexibility and/or resilience of the friction facings will allow an appreciable local compression or axial compliance of the sandwich comprising both friction facings and elastomeric layers under an axial pressure applied to a relatively small area of each friction facing at any region of the whole area of the facing.

But notwithstanding any local axial compliance the overall thickness t (FIG. 3) of the sandwich of friction facings 20 and 22 and carrier plate 4 reduces by at least 0.05 mm to 2.0 mm inclusive (in comparison with an unloaded state) when, in a clutch having a given size of driven plate, the assembly 2 is subject to the clamp load specified or rated for that driven plate. Examples of clamp loads which may be specified for certain different sizes of driven plates are shown in the table forming FIG. 7. An example of a preferred range of minimum reduction in thickness is 0.15 to 1.0 mm inclusive, and a more preferred range of minimum reduction in thickness in 0.4 to 1.0 mm inclusive.

FIG. 7 shows specified or rated axial pressures which may be applied over the whole area of the friction facings of driven plates of certain different sizes to attain the preferred range of reduction in thickness, such pressures lying within the range of 0.04 to 0.30 N/mm$^2$.

However when the assembly 2 forms part of a clutch driven plate in use in a motor vehicle clutch such as a diaphragm spring clutch, the subjective feel and quality of clutch re-engagements may be further enhanced by provisions of further cushioning such as between the pressure plate and diaphragm spring and/or between the diaphragm spring and a clutch cover. That further cushioning may be a wavy wire fulcrum ring as in British Patent No. 1583403.

Since the elastomeric bonding material 24 is to be used in a clutch driven plate it has to have both the aforesaid resistance to degradation by heat and also have good shear strength in both the mass of the elastomeric material and in the bonds it forms between itself and the friction facings and paddles.

To manufacture a friction material and carrier plate assembly which is in accordance with the invention, the elastomeric material in a fluid or paste form can be sandwiched between the carrier plate and friction facings and whole subject to some axial pressure to ensure good area contact between the elastomeric material and respectively the carrier plate and friction facings, but preferably the friction facings are maintained a predetermined distance apart. For example removeable spacing means can be disposed between the carrier plate and friction facings to ensure the elastomeric material layer between the plate and a respective friction facing has at least a minimum desired thickness. Then the elastomeric material is cured or vulcanised to render it solid and the spacing means are thereafter removed.

Figure 5:
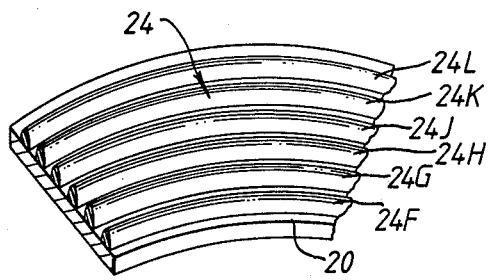
FIG. 5 is a fragment, on an enlarged scale, of a friction facing in the course of a method of making the assembly in FIG. 1.

As shown in FIG. 5, during manufacture of the assembly 2 (FIG. 1) the elastomeric material is applied as a paste in the form of annular stripes or beads, for example by a combing method, to each friction facing. Then the beads on the facings are applied against the paddles 14 and vulcanised. In the case of an RTV rubber vulcanising is merely by subjecting the paste to the appropriate room temperature and humidity for sufficient time. For example RTV 7057 vulcanises in about forty-eight hours at a temperature of about 25° C. and about 50% humidity.

Figure 3:
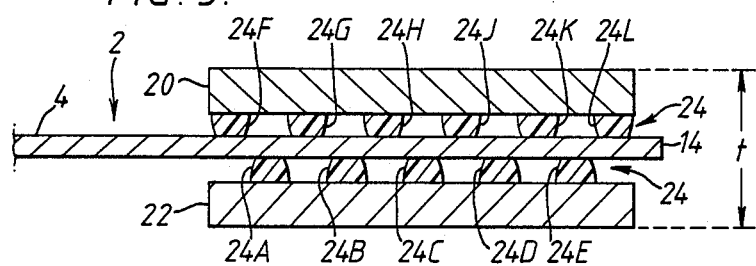
FIG. 3 is a section, on an enlarged scale, on line III—III in FIG. 1.
Figure 4:
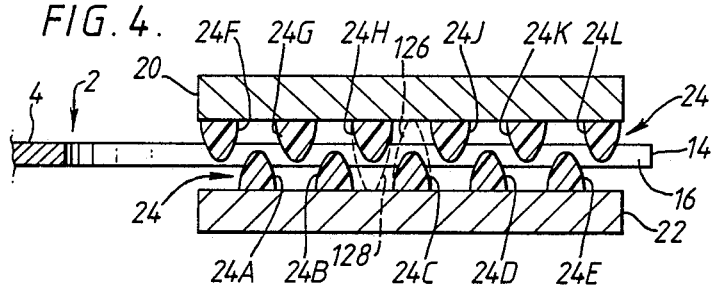
FIG. 4 is a section, on an enlarged scale, on line IV—IV in FIG. 1.

As shown in FIGS. 3 and 4 the elastomeric beads attached to one friction facing need not extend through the slots 16 to the other friction facing, but may do so as indicated at 126 and 128 (FIG. 4) if desired.

The elastomeric material may be in any desired formation; in the drawings it is shown as being in stripes or beads. If desired it may, at the paddles at least, extend as a continuous mass across substantially the whole width of each friction facing or be applied initially to paddles or friction facings as dots or in larger blobs.

In another embodiment of the invention and modifications thereof shown in FIGS. 8 to 15 and having the thickness t (FIG. 3) reduction characteristics aforesaid, the two substantially coincident and co-axial annular friction facings 20 and 22 of assembly 102 each have in one face a plurality of recesses 26 (which may be formed by moulding or by cutting) spaced by radial ribs 28. Bases 30 of the recesses are respectively bonded by the elastomeric material 24 to the opposite faces of each spoke 14. The elastomeric material is adhered directly to the friction facings 20, 22 and to the spokes 14.

Figure 8:
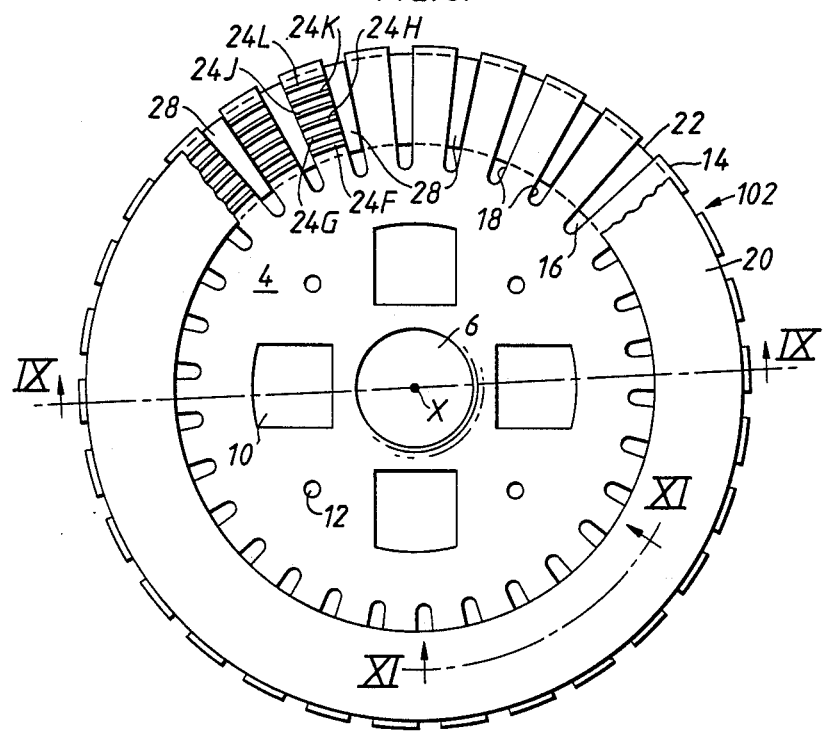
FIG. 8 is a plan view of a fragment of another embodiment of friction material and carrier assembly formed according to the invention and intended to form part of a dry friction clutch driven plate.
Figure 10:
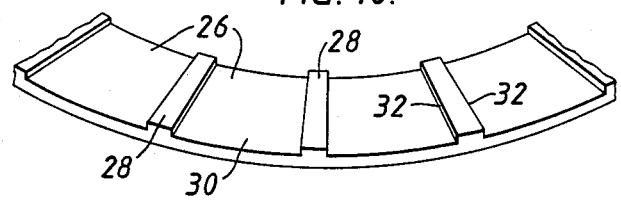
FIG. 10 is a perspective view of a fragment of a friction facing used in the assembly in FIG. 8.

As can be seen from FIGS. 8 and 11, edges 18 of the spokes 14 are in juxtaposition with radial edges 32 on the ribs 28. This provides a dog-type connection between the carrier plate 4 and the friction facings 20 and 22 capable of transmitting rotary motion (about axis X) from the friction facings to the carrier plate or vice-versa without subjecting the elastomeric layers 24 to undue shearing forces.

The assembly 102 can be constructed so that the elastomeric layers 24 serve to transmit rotary motion between the friction facings and the carrier plate, and the dog-type connection augment that transmission.

When an edge 32 on a rib 28 is in contact with an edge 18 of a spoke 14 that contact provides a positive limit to angular displacement of the friction facing material 20 or 22 relative to the carrier 4 or vice-versa, about the axis X. Such angular displacement may be small and may be substantially zero.

As can be seen in FIGS. 8 and 11, each recess 26 has a circumferential arc width equal to that of two spokes 14 and slot 16. In the example each recess 26 accommodates two adjacent spokes 14, however the facing 22 is off-set by about half the circumferential width of a recess 26 with respect to the facing 20. Thus the ribs 28 on one friction facing are substantially opposite the mid-point of the recesses 26 in the other facing. This means an edge 18 of a said spoke is adjacent to an edge 32 of a rib 28 of one facing whilst the other opposite edge 18 of that spoke is adjacent to an edge 32 of a rib on the other facing.

Other arrays of recesses in the friction facings may be used. In the extreme example either or both friction facings may each have only one rib 28, that rib being disposed between a pair of spokes 14. In the example shown in FIGS. 8 and 11, the vulcanised elastomeric material is initially applied to opposite faces of the paddles and then the friction facings are applied thereto. The elastomeric paste may be spread over substantially both sides of each spoke 14 as a continuous mass. Preferably the elastomeric material applied in discrete, separate, spaced amounts for example as dots or larger blobs or preferably in the form of spaced, concentric, arcuate beads or stripes shown for example in FIG. 9 and at 24F, 24G, 24H, 24J, 24K, and 24L in FIG. 8. Preferably the elastomeric stripes on one side of a spoke 14 are disposed opposite gaps between elastomeric stripes on the other side of the spoke. The stripes or beads may be applied by a combing technique.

In a preferred embodiment shown in FIG. 12 the elastomeric material 24 is initially applied to the bases 30 of the recesses 26 and then the carrier plate is sandwiched between the friction facings.

Because the paddles 14 in FIGS. 8 to 12 are relatively thin axially of the assembly 2, the axial envelope of one or more of the paddles may be enlarged to ensure the edges 18 of the paddle will engage the adjacent edge 32 of a rib 28.

As shown in FIG. 13 paddle 14¹ has its axial envelope enlarged by forming the paddle with a cross-section, radially of the assembly 2, having a corrugated or zig-zag form.

The crests and troughs of the zig-zag may be concentric and centered on axis X (FIG. 8). In FIG. 14 the paddle 14¹ is shown bonded to the friction facings by arcuate beads 24¹ of the elastomer. In FIG. 15 the axial envelope of the paddle 14 is enlarged by shim 33 flush rivetted at 36.

In a further embodiment of the invention and modifications thereof shown in FIGS. 16 to 20 and having the thickness t (FIG. 3) reduction characteristics aforesaid the spokes 14 in assembly 202 are, adjacent to the main body of the carrier plate, bent or cranked axially so as to be divided into one set of spokes 14A and another set of spokes 14B. All the spokes 14A lie in a substantially common plane which is, axially, to one side of the plane in which the main body of the carrier plate lies. Similarly all the spokes 14B lie in a substantially common plane which, is axially to the other side of the plane of the main body. Thus the set of spokes 14A is axially spaced from the set of spokes 14B. The spokes 14A alternate with the spokes 14B. If desired one of the sets of spokes may substantially lie in the plane of the main body of the carrier plate.

In the assembly 202 the two substantially coincident and co-axial annular friction facings 20 and 22 are bonded, preferably strongly, to the paddles 14A and 14B respectively. The bonds may be formed by axially thin amounts or layers 34 of adhesive which, has good torque transfer capacity so that the bonds enable rotary motion about axis X to be transmitted from any friction facing 20 or 22 to its corresponding paddles 14A or 14B and vice-versa. The resiliently, deformable elastomeric material 24 is disposed between the paddles 14A and the friction facing 22 and between the paddles 14B and the friction facing 20.

The layer of elastomer 24 provides resilient cushioning between the friction facings 20, 22 and the paddles 14 and axial cushioning between the friction facings.

In the assembly 202 the elastomeric material 24 is directly bonded to the paddles 14A, 14B and is not/or need not be bonded to the friction facings 20, 22. Alternatively the elastomeric material 24 may be directly bonded to the friction facings and not bonded to the paddles against which the elastomer presses. In a further variation the elastomeric material can be positioned in the slots 16 and extend between the friction facings.

Because the adhesive bonds 34 transmit torque between the paddles and the friction facings, the elastomeric material in assembly 202 is subject to little or no shearing force especially when it is only bonded to either the paddles or to the friction facings.

Figure 16:
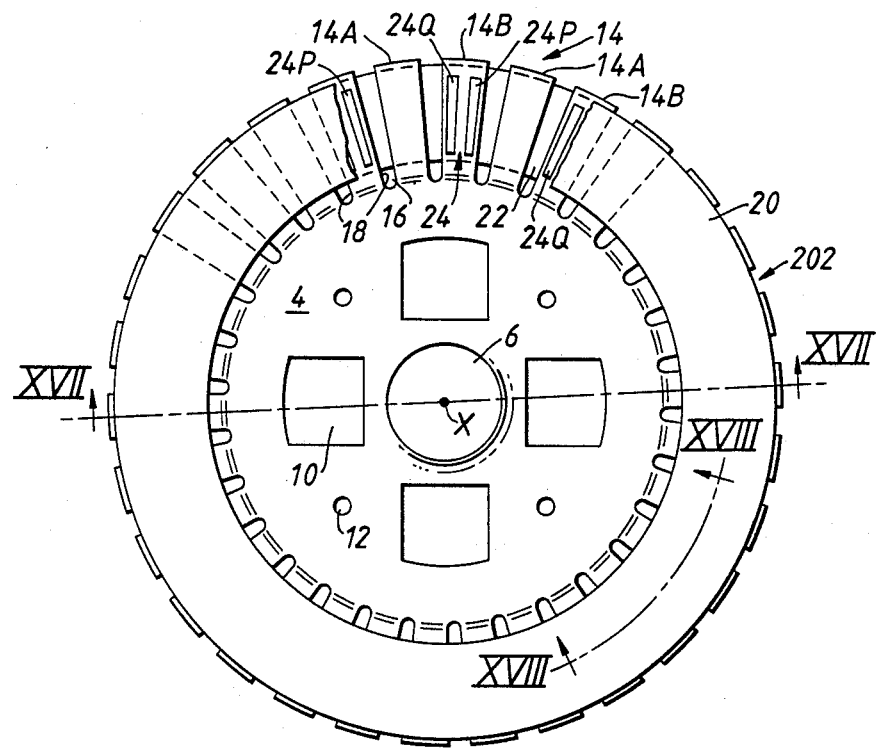
FIG. 16 is a plan view of a fragment of a friction material and carrier assembly formed according to further embodiment of the invention and intended to form part of a dry friction clutch driven plate.
Figure 17:
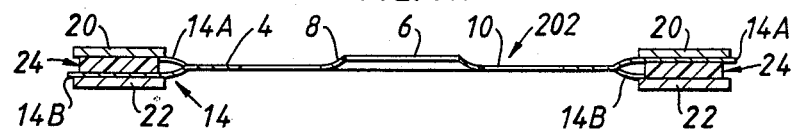
FIG. 17 is a section on line XVII—XVII in FIG. 16.
Figure 18:
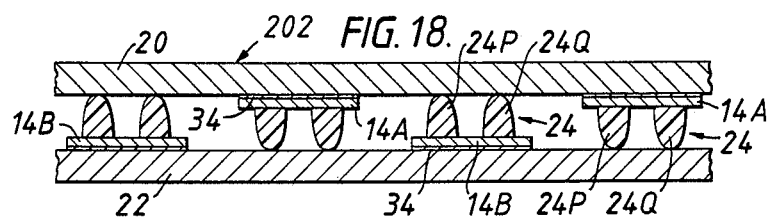
FIG. 18 is a diagrammatic section, on an enlarged scale, on line XVII—XVII in FIG. 16.

In FIGS. 16 to 18 the elastomer 24 is bonded to each paddle in the form of discrete, spaced, substantially radial beads or stripes 24P and 24Q. However the elastomer may be any other desired form, for example dots or larger blobs or as a continuous layer over each paddle.

During manufacture of the assembly 202 the elastomeric material 24 is applied to the paddles 14A and 14B as a paste in the form of stripes or beads 24P and 24Q, (for example by a combing method) of desired axial depth. Then the elastomeric material 24 is cured or vulcanised. After that the friction facings 20 and 22 are bonded to the paddles 14A and 14B using adhesive 34 so that the friction facings are held against the vulcanised material 24.

Figure 19:
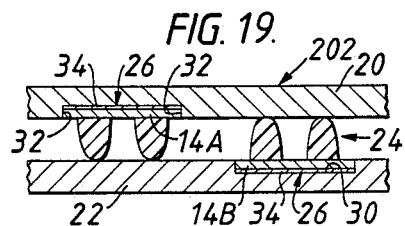
FIG. 19 is a section, similar to FIG. 18, of a modification of the assembly in FIG. 16.

In the modification in FIG. 19, the paddles 14A and 14B are bonded at 34 to bases 30 of radial recesses 26 in the friction facings 20 and 22. The sides of the paddles are in juxtaposition with sides 32 of the recesses 26 so that there is dog-type connection between the paddles and friction facings to assist in the transmission of torque between the friction facings and the paddles.

Figure 20:
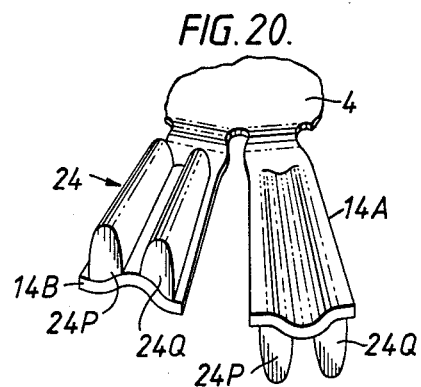
FIG. 20 is a fragment of a carrier used in another modification of the assembly in FIG. 16

In the modification in FIG. 20, each paddle 14A and 14B has a radial rib formation 36 which increases the area of the paddle to which elastomer beads 24P and 24Q bond.

In the embodiments described above with reference to FIG. 1 to 15, the elastomeric layers 24 may be so thin or replaced by other bonding material as to provide no axial cushioning. In that case the friction material forming the facings 20 and 22 is sufficiently resilient for each assembly 2 and 102 to have the thickness t (FIG. 3) reduction characteristics aforesaid and provide axial cushioning. Such resilient friction material may, if desired, be moulded onto the paddles so as to be integral therewith.

We claim:

1. A friction facing material and carrier assembly for a dry clutch driven plate, wherein said carrier assembly is sinuously flexible in a circumferential direction under a specified axial clamp load of the clutch, said friction facing material being disposed in an annular array around an being adhesively bonded to and flexible with said carrier, and said friction facing material and/or said bonding material and/or said carrier are/is so resiliently deformable that, under the specified axial clamp load, the overall thickness of said carrier and friction facing material between the clamping surfaces is reduced by between 0.05 mm and 2.00 mm inclusive.

2. An assembly as claimed in claim 1, wherein said minimum reduction in thickness of said carrier and friction facing material under said specified axial clamp load is between 0.15 mm and 1.0 mm inclusive.

3. An assembly as claimed in claim 2, wherein said minimum reduction in thickness of said carrier and friction facing material under said specified axial clamp load is between 0.4 and 1.0 mm inclusive.

4. An assembly according to claim 2, in which said reduction in thickness is attained by application to the friction material of an axial pressure in the range of 0.04 to $0.30 N/mm^2$.

5. An assembly as claimed in claim 1, wherein said carrier is a disc having its outer peripheral margin formed by radial spokes which can flex axially and are circumferentially spanned by said friction facing material.

6. An assembly as claimed in claim 1, wherein said carrier is a disc having its outer peripheral margin formed by radial spokes which can flex both axially and circumferentially and are circumferentially spanned by said friction material.

7. An assembly as claimed in claim 1, wherein said friction facing material is bonded to said carrier by at least one layer of solid elastomer.

8. An assembly as claimed in claim 7, wherein said layer is discontinuous.

9. An assembly as claimed in claim 8, wherein said elastomer is disposed as spaced beads which are spaced close enough to support said friction facing material uniformly but can spread laterally under clamp load.

10. An assembly as claimed in claim 1, wherein said friction facing material is angularly displaceable relative to said carrier under torque and said carrier and friction facing material have axially overlapping surfaces to abut and provide a positive limit to relative angular displacement of said friction facing material and said carrier.

11. An assembly as claimed in claim 10, wherein said friction facing material and carrier are formed to interengage axially by complementary ridge means providing edge abutments to limit relative angular displacement, the form of said ridge means being selected from the group consisting of radially castellated ridges and radially corrugated ridges.

12. An assembly as claimed in claim 1, wherein said carrier has central web and axially flexible radial spokes in at least two sets, at least one said set of spokes being axially offset towards one side of the carrier, and said friction facing material at each side of said carrier is bonded to a respective said set of spokes as a resiliently deformable assembly.

13. An assembly as claimed in claim 12, wherein two sets of said spokes are respectively offset in planes on opposite sides of said carrier.

14. An assembly as claimed in claim 1, wherein said friction material has sufficient resilience to provide for said stated reduction in thickness under clamp load.

* * * * *